(12) United States Patent
Gabrieli et al.

(10) Patent No.: US 12,077,395 B2
(45) Date of Patent: Sep. 3, 2024

(54) CART WITH TILT MECHANISM

(71) Applicant: Aquabot Ltd., Afula (IL)

(72) Inventors: David Shlomo Gabrieli, Ramat Yishai (IL); Shay Shlomo Gabrieli, Ramat Yishai (IL)

(73) Assignee: Aquabot Ltd., Afula (IL)

( * ) Notice: Subject to any disclaimer, the term of this patent is extended or adjusted under 35 U.S.C. 154(b) by 28 days.

(21) Appl. No.: 17/799,672

(22) PCT Filed: Dec. 29, 2020

(86) PCT No.: PCT/IL2020/051347
§ 371 (c)(1),
(2) Date: Aug. 13, 2022

(87) PCT Pub. No.: WO2021/165949
PCT Pub. Date: Aug. 26, 2021

(65) Prior Publication Data
US 2023/0080709 A1    Mar. 16, 2023

Related U.S. Application Data

(60) Provisional application No. 62/978,323, filed on Feb. 19, 2020, provisional application No. 62/982,155, filed on Feb. 27, 2020.

(51) Int. Cl.
*B65G 47/96* (2006.01)
*B65G 17/34* (2006.01)
(Continued)

(52) U.S. Cl.
CPC ......... *B65G 47/962* (2013.01); *B65G 35/06* (2013.01); *B65G 47/52* (2013.01); *B65G 17/345* (2013.01)

(58) Field of Classification Search
CPC ...... B65G 47/962; B65G 35/06; B65G 47/52; B65G 17/345
(Continued)

(56) References Cited

U.S. PATENT DOCUMENTS 3,360,106 A * 12/1967 Harrison ............ B65G 47/962
414/382
3,510,014 A    5/1970 Speaker et al.
(Continued)

FOREIGN PATENT DOCUMENTS

CH    710851    9/2016
JP    S52152070    12/1977
(Continued)

OTHER PUBLICATIONS

International Search Report for PCT Application No. PCT/IL2020/051347 dated Apr. 7, 2021.

*Primary Examiner* — Mark A Deuble
(74) *Attorney, Agent, or Firm* — PEARL COHEN ZEDEK LATZER BARATZ LLP

(57) ABSTRACT

A carrier includes a chassis that is configured to travel from a loading point to an unloading point and a tillable platform is mounted on the chassis. A resilient piston is connected between the chassis and the tillable platform, the piston configured to store energy when the platform is rotated from an unloading orientation to a loading orientation. The platform, when in the loading orientation, is configured to stably support one or more items that are loaded onto the platform at the loading point. A restraining mechanism is configured to maintain the platform in the loading orientation and a triggering mechanism is operable to release the restraining mechanism, releasing the stored energy of the piston to exert a restoring force to tilt the platform from the loading orientation to the unloading orientation.

19 Claims, 8 Drawing Sheets

(51) Int. Cl.
*B65G 35/06* (2006.01)
*B65G 47/52* (2006.01)

(58) Field of Classification Search
USPC .......................................... 198/370.04–370.5
See application file for complete search history.

(56) References Cited

U.S. PATENT DOCUMENTS

| | | | | |
|---|---|---|---|---|
| 5,054,601 | A * | 10/1991 | Sjogren | B65G 47/962 |
| | | | | 198/805 |
| 5,489,017 | A | 2/1996 | Bonnet | |
| 5,730,273 | A * | 3/1998 | Boller | B65G 47/962 |
| | | | | 209/912 |
| 6,009,992 | A | 4/2000 | Erceg et al. | |
| 6,082,522 | A * | 7/2000 | Polling | B65G 47/962 |
| | | | | 198/370.04 |
| 6,231,293 | B1 * | 5/2001 | Ostholt | B65G 17/46 |
| | | | | 414/418 |
| 6,247,576 | B1 | 6/2001 | Bonnet | |
| 8,851,267 | B2 * | 10/2014 | Sotelo | B65G 47/38 |
| | | | | 198/370.04 |
| 2003/0183482 | A1 * | 10/2003 | Boller | B65G 47/965 |
| | | | | 198/360 |
| 2019/0248601 | A1 | 8/2019 | Tang | |

FOREIGN PATENT DOCUMENTS

| | | | |
|---|---|---|---|
| JP | A 60-157421 | 8/1985 | |
| JP | A 60-252521 | 12/1985 | |

* cited by examiner

CART WITH TILT MECHANISM

CROSS-REFERENCE TO RELATED APPLICATIONS

This application is a U.S. National Phase Application of PCT International Patent Application No. PCT/IL2020/051347 International Filing Date Dec. 29, 2020, claiming the benefit of U.S. Provisional Applications Nos. 62/978,323, filed Feb. 19, 2020 and 62/982,155 filed Feb. 27, 2020 which are hereby incorporated by reference.

FIELD OF THE INVENTION

The present invention relates to transport of items. More particularly, the present invention relates to a cart with a tilt mechanism for transporting items.

BACKGROUND OF THE INVENTION

In sorting systems, order fulfillment systems, and other types of delivery systems, various types of goods and items are transported from one location to another. For example, in a sorting system, an item may be transported from a source location, e.g., a loading dock where items are received from a sender, to one of several destination locations, e.g., unloading docks from which items are transported toward different delivery destinations. In an order fulfillment system, ordered items may be transported from a location where that item is stocked (e.g., in a store or warehouse) to a location (e.g., a loading dock) from which ordered items are delivered to the customer who placed the order.

Various transport mechanisms may be utilized in such a delivery system. Examples of transport mechanisms include conveyor belts, conveyor baskets that are suspended from overhead tracks, self- or externally-propelled carts that are confined (e.g., mechanically, electromagnetically, or otherwise) to travel along fixed tracks (e.g., consisting or rails, grooves, channels or tunnels, waterways, guide wires, or other guiding structure), self-propelled vehicles, or other transport mechanism.

SUMMARY OF THE INVENTION

There is thus provided, in accordance with and embodiment of the invention, a carrier including: a chassis that is configured to travel from a loading point to an unloading point; a tiltable platform that is mounted on the chassis; a resilient piston that is connected between the chassis and the tiltable platform, the piston configured to store energy when the platform is rotated from an unloading orientation to a loading orientation, the platform, when in the loading orientation, configured to stably support one or more items that are loaded onto the platform at the loading point; a restraining mechanism that is configured to maintain the platform in the loading orientation; and a triggering mechanism that is operable to release the restraining mechanism, releasing the stored energy of the piston to exert a restoring force to tilt the platform from the loading orientation to the unloading orientation.

Furthermore, in accordance with an embodiment of the present invention, the loading orientation is substantially horizontal.

Furthermore, in accordance with an embodiment of the present invention, the platform is tiltable to either of two unloading orientations.

Furthermore, in accordance with an embodiment of the present invention, a direction of tilt of a first unloading orientation of the two unloading orientations is opposite to a direction of tilt of a second unloading orientation of the two unloading orientations Furthermore, in accordance with an embodiment of the present invention, the restraining mechanism includes at least one latch.

Furthermore, in accordance with an embodiment of the present invention, each latch of the at least one latch is configured to engage a pin to maintain the platform in the loading orientation.

Furthermore, in accordance with an embodiment of the present invention, the triggering mechanism includes a trigger arm that is operable to retract a latch of the at least one latch from engaging its pin.

Furthermore, in accordance with an embodiment of the present invention, the restraining mechanism further includes at least one spring, each spring configured to maintain a latch of the of each one latch in a position to engage its pin, and to restore that latch to that position after retraction of that latch.

Furthermore, in accordance with an embodiment of the present invention, the at least one latch is mounted on the chassis and is configured to engage a pin that is mounted on the platform.

Furthermore, in accordance with an embodiment of the present invention, the at least one latch includes two latches that are each configured to engage a different pin of two pins that are mounted at different sides of the platform.

Furthermore, in accordance with an embodiment of the present invention, the triggering arm is rotatable in one direction to retract one latch of the two latches to enable the platform to tilt to one of two unloading orientations, and in another direction to retract the other latch of the two latches to enable the platform to tilt to another of two unloading orientations.

Furthermore, in accordance with an embodiment of the present invention, the piston is configured to apply the restoring force to a point along a midline between the two pins such that when the triggering arm is rotated to retract one of the two latches from one of the two pins, the restoring force rotates the platform about the pin of the two pins from which the other of the two latches was not retracted.

Furthermore, in accordance with an embodiment of the present invention, the triggering arm is connected to each of the two latches by a different lateral arm.

Furthermore, in accordance with an embodiment of the present invention, an elongated slot extends along an elongated dimension of each lateral arm.

Furthermore, in accordance with an embodiment of the present invention, the triggering arm is connected to the lateral arms by a trigger pin on the triggering arm that is inserted into the elongated slots of both arms.

Furthermore, in accordance with an embodiment of the present invention, the platform is configured to rotate about an axis that is located substantially at a midline between opposite ends of the platform and the pin is mounted between the axis and one of the opposite ends of the platform.

Furthermore, in accordance with an embodiment of the present invention, the piston is configured to exert the restoring force on the platform on the side of the axis on which the pin is mounted.

Furthermore, in accordance with an embodiment of the present invention, the platform includes a barrier to prevent an item from falling off of the platform.

Furthermore, in accordance with an embodiment of the present invention, the barrier includes a door that is configured to remain closed when the platform is in the loading orientation, and to open when the platform is tilted to the unloading orientation such that the door is tilted downward.

Furthermore, in accordance with an embodiment of the present invention, a mechanism for opening the door includes a rod that is coupled to the door that is displaceable by contact with a column that is fixed to the chassis.

Furthermore, in accordance with an embodiment of the present invention, the carrier includes a spring to keep the door closed when the door is not tilted downward.

Furthermore, in accordance with an embodiment of the present invention, the unloading configuration is configured to enable the one or more items to slide off of the platform in a direction that is substantially perpendicular to a direction of travel of the carrier.

Furthermore, in accordance with an embodiment of the present invention, the carrier is configured to travel along a track.

Furthermore, in accordance with an embodiment of the present invention, the carrier is configured to be magnetically propelled along the track.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
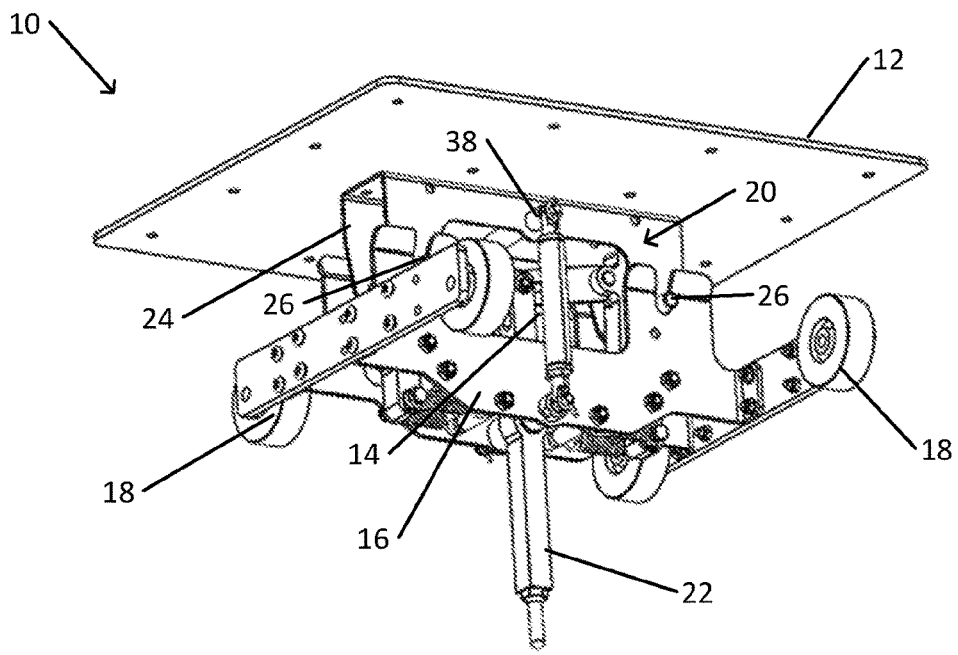
FIG. 1 schematically illustrates a carrier in the form of a cart with a bidirectional tilting mechanism, in accordance with some embodiments of the invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the invention, a carrier includes a platform that is tiltable between a loading orientation (typically horizontal) in which items may be loaded onto the platform at a loading point and an unloading orientation (typically slanted). The loading orientation is selected so as to prevent or impede the objects that are placed on the platform from falling off of the platform, when the cart is still or moving. The carrier may then be transported by a transporter mechanism with the items that were loaded onto the platform to an unloading point where the items are to be unloaded from the platform. When the carrier is at the unloading point, a triggering mechanism may be activated (e.g., by a mechanism that is located at the unloading point), to release a restraining mechanism that is constraining the platform to remain in the loading orientation. As are result of releasing the restraining mechanism, a restoring force that is exerted by a resilient piston mechanism may apply a torque to the platform to tilt the platform (e.g., from the horizontal) to an unloading orientation.

For example, the platform may be configured to rotate about one or more axes. In a typical unidirectional tilting mechanism, the platform includes a single rotation axis, e.g., near a midline of the platform or elsewhere along the platform. In a typical bidirectional tilting mechanism, one rotation axis is located at one end of the platform and another at an opposite end of the platform. When a direction of tilt is selected, the restraining mechanism restrains one of the rotation axes, while the other is released to enable the platform to rotate and tilt about the restrained axis. Typically, the two axes are parallel to one another. In other examples, one axis may be rotated relatively to the other (typically by a small angle, e.g., less than 45°).

In some examples (e.g., with multiple pistons and restraining mechanisms), the platform may be configured to rotate about mutually perpendicular or nonparallel axes (e.g., so as to enable tilting in two perpendicular directions, or in three or more directions).

The piston mechanism may include a compressible gas piston, a compressible or stretchable spring, a coil that may be tightened or wound, a pair of separable mutually attracting magnets or compressible mutually repelling magnets (e.g., confined to linear motion by an elongated tube, cage, guide wire, or otherwise), or another resilient component that may be forced out of an equilibrium state. Any such resilient component is herein referred to as a piston. For example, one end of the piston may be attached to the platform or to structure that is attached to the platform, while the opposite end is attached to the chassis of the carrier (e.g., a fixed, non-rotatable component of the carrier, or to a component that is attached to the chassis. In some cases, one or both of the connections of the ends of the piston to the platform or chassis may be hinged or pivoted to enable relative rotation between the piston and the component to which that end is connected. The rotation may enable or facilitate continued compression or elongation of the piston as the length of the piston changes. Alternatively or in addition, one or both ends of the piston may be configured to push against the platform or chassis (e.g., confined to an indentation or otherwise constrained to prevent dislocation of the piston) without being attached.

When a force is applied to the piston to change the piston from its equilibrium configuration (e.g., by compression, stretching, rotation, or otherwise), the resulting potential energy is stored in the piston. The restraining force prevents release of the stored potential energy by preventing the piston from reverting to its equilibrium configuration. Operation of the triggering mechanism may remove the restraining force, enabling the piston to revert to its equilibrium configuration. The restoring force that results from release of the stored potential energy may then apply a torque to the platform to tilt the platform to the unloading orientation.

The restraining mechanism is configured to provide a counterforce to the restoring force of the piston to prevent the piston mechanism from tilting the platform to the unloading orientation until the carrier is transported to the unloading point (or when the items are otherwise to be unloaded from the carrier). For example, the restraining mechanism may include a mechanical latch that is mounted on the carrier (e.g., on a chassis of the carrier) that is configured to engage cooperating structure of the platform or piston mechanism so as to counter the restoring force that is exerted by the piston. Alternatively or in addition, the restraining mechanism may include a mechanical latch that is mounted on the platform or piston mechanism and that is configured to engage cooperating structure that is mounted on the carrier (e.g., the chassis). The cooperating structure may include a pin, bar, ring, notch, or other projecting or indented structure that may be engaged by a latch. As another example, the restraining mechanism may include a pin or other projection that is insertable into an indentation on a rotatable component of the restraining mechanism, so as to prevent rotation of that component. As another example, the restraining mechanism may include an electromagnet or another restraining mechanism.

The restraining mechanism includes, or cooperates with, a triggering mechanism that may be operated to release the restraining mechanism. When the restraining mechanism is released, a restoring force that is exerted by the piston mechanism may tilt the platform to the unloading orientation. For example, when the restraining mechanism includes a mechanical latch or pin, the triggering mechanism may include an arm, lever, knob, gear, or other component that when operated (e.g., rotated or displaced) disengages the latch or pin from cooperating structure or indentation. When the restraining mechanism includes multiple latches or pins, a direction of rotation of the rotating component may determine which of the latches is disengaged, thus determining a direction of tilt of the platform. When the restraining mechanism includes an electromagnet, the triggering mechanism may interrupt electrical current that is flowing through coils of the electromagnet.

When the platform is tilted to the unloading orientation, the items may slide off the platform under the force of gravity, or the unloading orientation may otherwise facilitate removal of the items from the platform (e.g., by a pushing or pulling force that is weaker than the force that would be required to unload the items when the platform is in the loading orientation). For example, the items may slide into a chute, bin, basket, sack, or other container, or onto another platform or vehicle, for further transport to a destination. Typically, the platform in an unloading orientation is tilted in a direction that is substantially perpendicular to a direction of travel of the carrier. For example, when the carrier is configured to travel along a track, the tilting may cause the loaded items to slide off of the platform to either side of the track.

In some cases, e.g., when the piston is a gas piston, the piston may be adjustable (e.g., by adjusting a size of an aperture that enables passage of gas, e.g., air, between the interior of the piston and the ambient atmosphere) so as to limit the applied restoring force or rate of application of the restoring force to a desired force or rate. In other examples, the piston mechanism may include a damping mechanism (e.g., a pneumatic, hydraulic, friction, electromagnetic, or other type of damper) to limit the rate at which the platform is tilted from the loading orientation to the unloading orientation. For example, the adjustable piston or damper may be adjusted prevent jarring of fragile items that are loaded onto the platform. The piston or damper may be adjusted for a particular type of load.

In some cases, one or more of the restraining mechanism or the piston mechanism may be configured to tilt the platform to one or more orientations that are intermediate between the loading orientation and the unloading orientation. For example, such and intermediate orientation may enable display of an item that is supported by the platform, or access to the item, e.g., for the purpose of marking, inspecting, or otherwise handling or interacting with the item.

In order to enable tilting to an intermediate orientation, the piston mechanism may include pistons of different lengths in their equilibrium states. In another example, a restraining mechanism my enable restraining the platform in different orientations. For example, multiple selectable latches or cooperating structures may be provided that are each configured to restrain the platform at different tilt angles.

The carrier may include a cart, vehicle, suspended gondola, or other device capable of moving goods or items from one or more loading points where the items are placed onto the platform to the unloading point where the platform is tilted to remove the items from the carrier. A transporter mechanism for transporting the carrier from one location to another may include a magnetic propulsion mechanism. For example, the magnetic propulsion mechanism may include a magnet that is drawn along a track to drag the carrier along the track. Alternatively or in addition, the carrier may include a self-propulsion mechanism (e.g., an electrically or otherwise powered motor, a transmission mechanism, and wheels, or another type of self-propulsion mechanism), may be towed or otherwise externally propelled (e.g., by connection to a cable, water current, air current, or otherwise that is typically confined to a fixed route), or may be otherwise propelled. For example, the carrier may include wheels, runners, glides, or other structure to facilitate transport of the carrier over a channel, surface, rail, cable, or other type of surface or guide structure.

A carrier with a tiltable platform operated by a piston mechanism and restraining mechanism, as described herein, may be advantageous over carriers with a motorized tilting mechanism. Typically, a motor and a suitable power supply would add extra weight to the carrier, and would likely require greater maintenance costs than a carrier as described herein. Also, a motor would require a complex communications or control system in order to properly control operation of the motor on movable carriers. On the other hand, a bidirectional or unidirectional tilting system as described herein would only require a triggering system, which is typically external to carrier, in order to tilt the platform.

A bidirectional tilting mechanism may enable flexibility in enabling unloading from either side of the carrier. A unidirectional tilting mechanism may enable the piston to operate with a greater mechanical advantage (e.g., longer lever arm) than a bidirectional tilting mechanism. Thus, a bidirectional tilting platform may be advantageous where increased flexibility of unloading is required, while a unidirectional tilting mechanism may be advantageous when heavier loads are to be transported.

Figure 2:
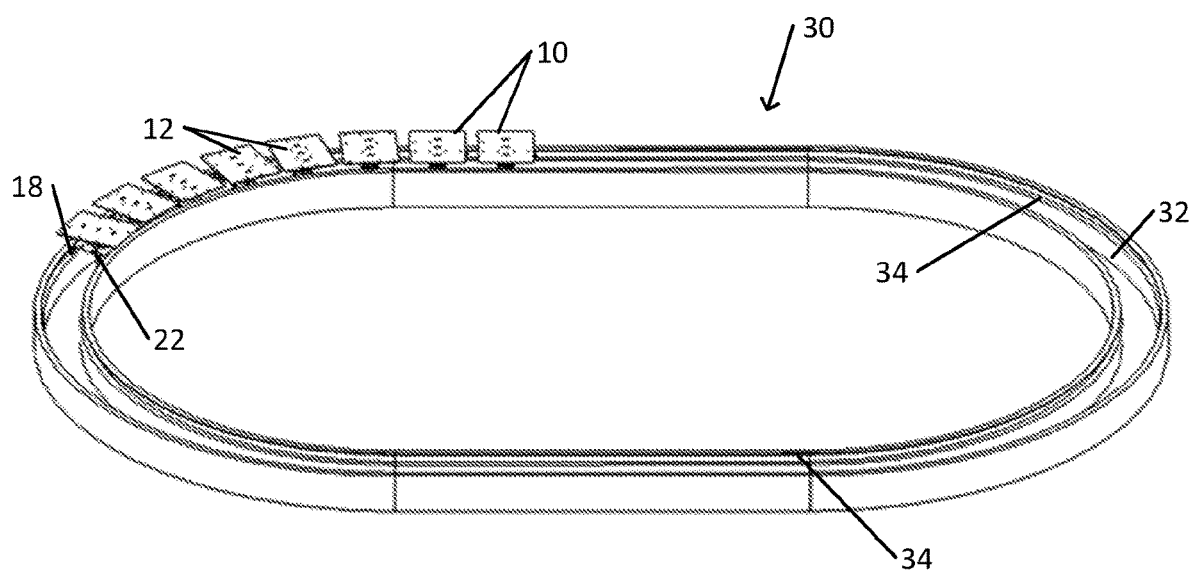
FIG. 2 schematically illustrates carriers, such as the cart shown in FIG. 1, on a sorting track, in accordance with some embodiments of the invention.

FIG. 1 schematically illustrates a carrier in the form of a cart with a bidirectional tilting mechanism, in accordance with an embodiment of the invention. FIG. 2 schematically illustrates carriers, such as the cart shown in FIG. 1, on a sorting track.

Carrier cart 10 includes a tiltable platform 12 onto which one or more items may be placed for transport. In the example shown, tiltable platform 12 is oriented in a loading orientation that is substantially horizontal. When in the loading orientation, items that are placed onto tiltable platform 12 may be stably supported and transported, e.g., from one location along sorting track 30 to another location along sorting track 30. In some cases, tiltable platform 12 may include one or more partial enclosures, posts, or other barriers that may prevent an item from accidently falling off of tiltable platform 12. The barriers may be designed, e.g., with minimal height, with one or more openings, with one or more lowerable or foldable sections, or otherwise, so as not to interfere with unloading of the items from tiltable platform 12.

In the example shown, sorting track 30 is a simple oval track. In other examples, a sorting track may have another shape, and may include branches and intersections.

When tiltable platform 12 is in the loading orientation, both latch pins 26 on platform bracket 24, to which tiltable platform 12 is attached, are held in place by restraining mechanism (described below). In other examples, latch pins 26 may be otherwise attached to tiltable platform 12.

In the example shown, tiltable platform 12 may be tilted bidirectionally by bidirectional tilt mechanism 20. When tilting tiltable platform 12, bidirectional tilt mechanism 20 may rotate platform bracket 24 in either direction about one of latch pins 26. The direction of rotation is determined by the direction of a lateral force that is applied to trigger arm 22.

When trigger arm 22 is laterally pushed to be displaced or to rotate to one side (e.g., by an activating mechanism, not shown, located along sorting track 30), the restraining mechanism releases one of latch pins 26, determined by the direction in which trigger arm 22 is rotated. Pistons 14 (only one piston 14 is visible in FIG. 1), may then exert an upward force on platform connection bar 38. Typically, platform connection bar 38 is located near a midline between latch pins 26, as in the example shown (e.g., such that the upward force that is exerted by pistons 14 on tiltable platform 12 is substantially equal, without regard to which of latch pins 26 is released). In other examples, platform connection bar 38, or other structure to which pistons 14 connect, may be located elsewhere relative to tiltable platform 12.

The upward force exerts a torque on tiltable platform 12 to rotate platform bracket 24 and tiltable platform 12 about the latch pin 26 that is still restrained by the restraining mechanism. Tiltable platform 12 may thus be tilted to one of two oppositely tilted unloading orientations. When tiltable platform 12 is tilted to one of the unloading orientations, unloading of items from tiltable platform 12 and carrier cart 10, e.g., to a chute, platform, bin, sack, or other destination may be facilitated.

In the example shown, piston 14 is in the form of a gas piston that is compressed when tiltable platform 12 is in the loading orientation. In other examples, piston 14 may include another type of compressible resilient element. In other examples, e.g., with a different arrangement of the tilt mechanism, e.g., with the piston attached to an edge of tiltable platform 12 and to structure that extends above tiltable platform 12, the piston may include a stretchable resilient element that is stretched when tiltable platform 12 is in the loading orientation.

Carrier cart 10 is configured to travel on wheels 18. In the example shown, wheels 18 are freely rotating, lacking a motor and transmission. For example, carrier cart 10 may be pushed or towed by a propulsion mechanism of sorting track 30, or of another system. In other examples, a carrier cart 10 may be self-propelled (e.g., remotely controlled).

Wheels 18 are mounted on carrier chassis 16 of carrier cart 10. Carrier chassis 16 is configured to remain at a constant tilt angle (typically without tilt) with respect to a surface or track on which it is travelling, e.g., sorting track 30, with tiltable platform 12 being tilted relative to carrier chassis 16.

In the example shown, sorting track 30 includes wheel tracks 34 within which wheel 18 are constrained to travel. Wheel tracks 34 are located on either side of, and raised relative to the bottom of, channel 32. Trigger arm 22 is configured to extend downward into channel 32. Thus, one or more mechanisms that are each configured to apply a lateral force to activate trigger arm 22, e.g., at a potential unloading location, may be located within channel 32. After activation of trigger arm 22, bidirectional tilt mechanism 20 may tilt tiltable platform 12 in to one of the unloading orientations in order to facilitate unloading of items from tiltable platform 12 and carrier cart 10.

After items are unloaded from tiltable platform 12, tiltable platform 12 may remain in the unloading orientation until a downward force is applied to a raised end or section of tiltable platform 12. The force may push the raised part of tiltable platform 12 downward until tiltable platform 12 is in the loading orientation. When in the loading orientation, the restraining mechanism may engage the previously released latch pin 26 to again restrain tiltable platform 12 in the loading orientation. A mechanism for applying such a downward force may be located at one or more locations along sorting track 30. For example, such a mechanism may be located at or near a location where items are to be loaded onto carrier cart 10, or where carrier carts 10 are stored until needed.

In another example, tiltable platform 12 may be tilted to an unloading orientation by lowering one end of tiltable platform 12 (with corresponding changes in the configuration of latches, springs, and other components). In this case, restoring tiltable platform 12 to a loading orientation may entail raising the lowered end.

A propulsion mechanism, e.g., cable, cog mechanism, or other propulsion mechanism, may be located within channel 32, wheel tracks 34, or elsewhere.

Figure 8A:
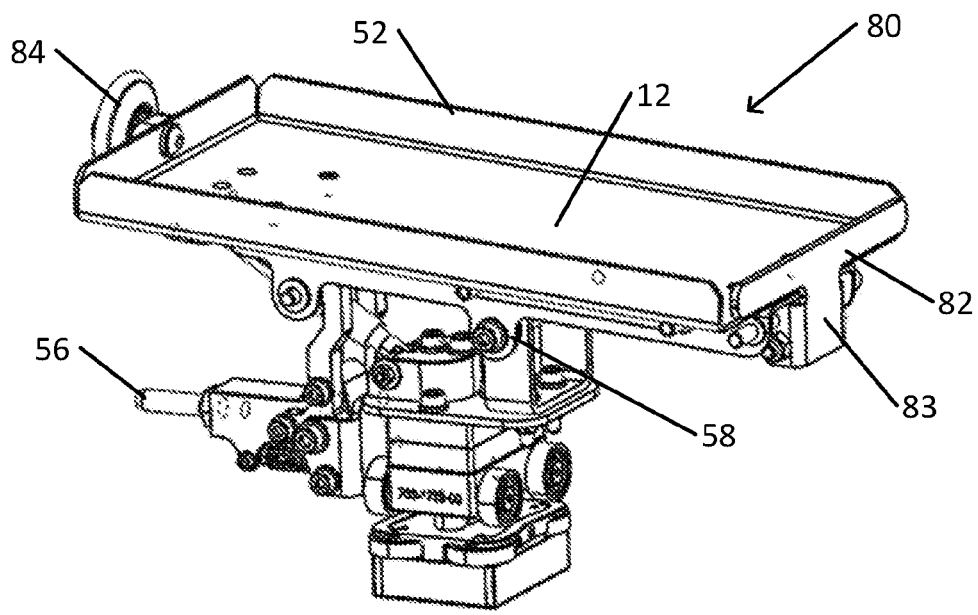
FIG. 8A schematically illustrates a variant of the carrier cart shown in FIG. 5A that includes a door mechanism with its platform in the loading orientation and the door closed.

After items are unloaded from tiltable platform 12 in the unloading orientation, a mechanism may be provided at one or more locations along sorting track 30 to push downward on a raised edge or point on tiltable platform 12. The downward pushing may tilt tiltable platform 12 back to the loading orientation. The pushing mechanism may include an arm, lever, piston, inclined surface, or other mechanism. For example, as described below, tiltable platform 12 may include structure (e.g., reset wheel 84 as shown in FIG. 8A) that may be pushed downward by inclined structure (e.g., an inclined plane or track) as carrier cart 10 is propelled past the inclined structure.

Figure 3A:
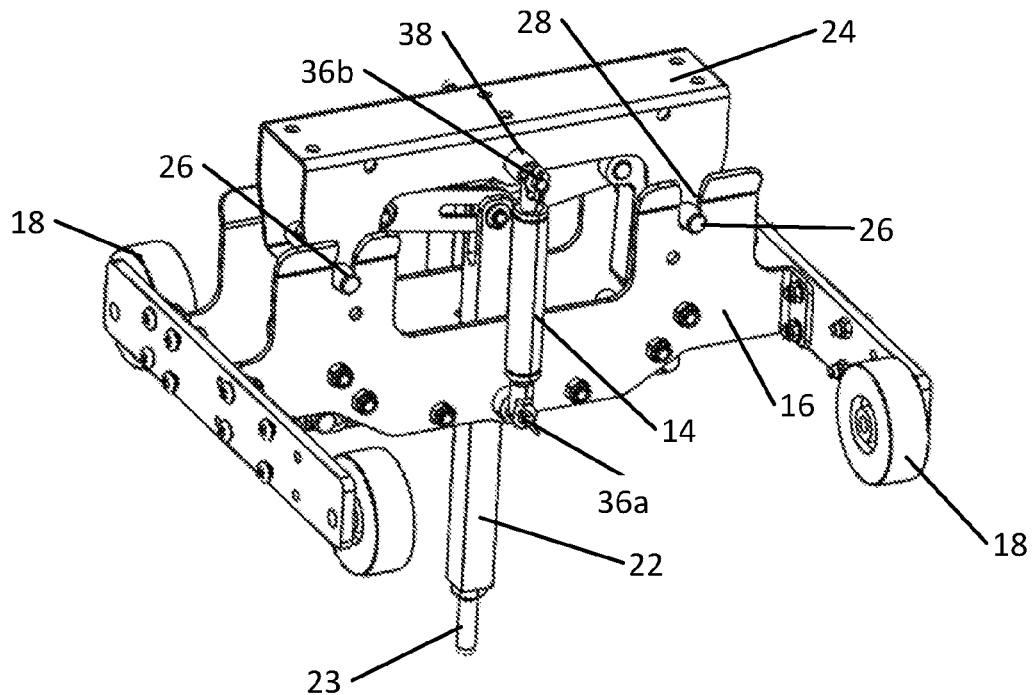
FIG. 3A schematically illustrates a tilting mechanism of the carrier cart shown in FIG. 1.
Figure 3B:
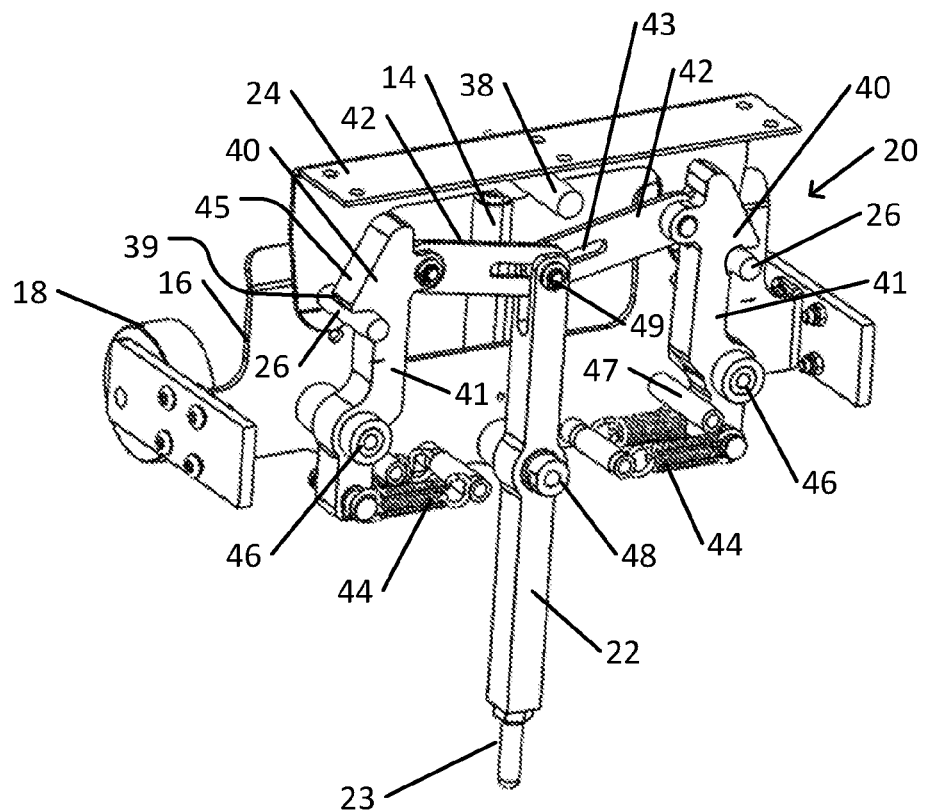
FIG. 3B schematically illustrates the mechanism shown in FIG. 3A with parts removed to expose the restraining and triggering mechanisms.

FIG. 3A schematically illustrates a tilting mechanism of the carrier cart shown in FIG. 1. FIG. 3B schematically illustrates the mechanism shown in FIG. 3B, with parts removed to expose the restraining and triggering mechanisms.

Each piston 14 is connected to carrier chassis 16 at chassis connection 36a, and to platform connection bar 38 of platform bracket 24 at bracket connection 36b. Chassis connection 36a enables piston 14 to rotate relative to carrier chassis 16. Similarly, bracket connection 36b enables piston 14 to rotate relative to platform bracket 24. The resilience of piston 14 when compressed causes piston 14 to exert a force that tends to push bracket connection 36b and platform bracket 24 away from chassis connection 36a and carrier chassis 16.

In the example shown, latch pins 26 are attached to platform bracket 24. When platform bracket 24 is in the (horizontal) loading configuration, as shown, each latch pin 26 fits into a pin notch 28 in carrier chassis 16 and is engaged by a latch 40 on a latch arm 41. Each latch arm 41 is configured to rotate about latch arm axis 46. A latch spring 44 maintains a torque on latch arm 41 to hold latch 40 against, and engaged with, latch pin 26. Latch 40, by engaging latch pin 26, provides a restraining mechanism that prevents the resilience of pistons 14 from moving or tilting platform bracket 24, and thus tiltable platform 12. Thus, latches 40 of the restraining mechanism maintain tiltable platform 12 in the loading configuration.

One of latches 40 on a latch arm 41 may be retracted away from its engaged latch pin 26 by lateral rotation of trigger arm 22 about trigger arm axis 48. Trigger arm axis 48, which is fixed to carrier chassis 16, enables lateral (e.g., in a plane that is substantially perpendicular to a direction of travel of carrier cart 10, e.g., as determined by the orientation and configuration of wheels 18) rotation of bidirectional tilt mechanism 20 relative to carrier chassis 16. For example, a force that rotates trigger arm 22 may be applied to trigger arm extension 23. When a latch 40 is retracted, pistons 14 may exert a force on platform bracket 24 that pushes the previously engaged latch pin 26 away from that latch 40. Latch spring 44 may then rotate latch arm 41 back toward its previous (engaged) orientation, until stopped by contact with latch arm stop 47. When latch arm 41 contacts latch arm stop 47, the orientation of latch arm 41 is substantially the same as its orientation when previously engaging latch pin 26.

A lateral trigger arm 42 extends from trigger arm 22 to each latch arm 41. Trigger pin 49 that is attached to trigger arm 22 passes through an arm slot 43 of each lateral trigger arm 42. Each arm slot 43 is elongated along an elongated dimension of lateral trigger arm 42, in a direction between trigger arm pin 49 and the latch arm 41 to which that lateral trigger arm 42 extends. When trigger arm 22 is rotated about trigger arm axis 48 such that trigger arm pin 49 is rotated away from one of latch arms 41, trigger arm pin 49 may pull on a proximal end of the lateral trigger arm 42 that is connected to that one latch arm 41. The pulled latch arm 41 rotates about its latch arm axis 46 until latch 40 of the pulled latch arm 41 is pulled away and disengages from the latch pin 26 that was previously engaged. Concurrently, trigger arm pin 49 may travel along the length of the arm slot 43 of the other lateral trigger arm 42 toward which trigger arm pin 49 is being rotated. The latch 40 toward which trigger arm pin 49 rotates may remain in place so as to continue to engage the latch pin 26 on that other side. Thus, one latch pin 26 is disengaged as the other latch pin 26 remains engaged, enabling platform bracket 24, and its attached tiltable platform 12, to be tilted in one direction by bidirectional tilt mechanism 20.

Figure 4A:
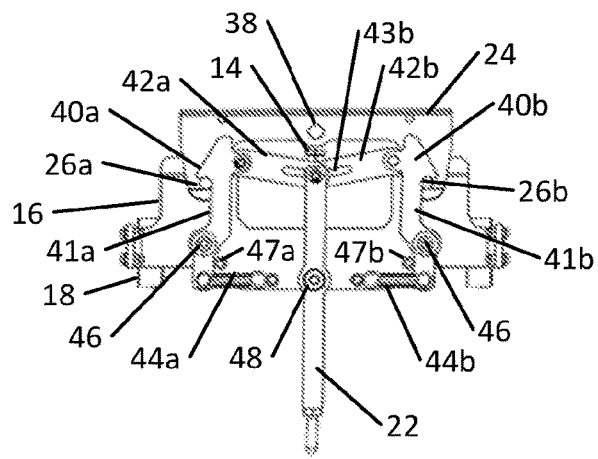
FIG. 4A is a schematic side view of the tilting mechanism shown in FIG. 3B when in a loading orientation.

FIG. 4A is a schematic side view of the tilting mechanism shown in FIG. 3B when in the loading orientation.

In FIG. 4A, as in FIG. 3B, platform bracket 24 is horizontal, in the loading orientation, and latches 40a and 40b engage latch pins 26a and 26b, respectively, with latch arms 41a and 41b held by latch springs 44a and 44b, respectively, against latch arm stops 47a and 47b, respectively.

Figure 4B:
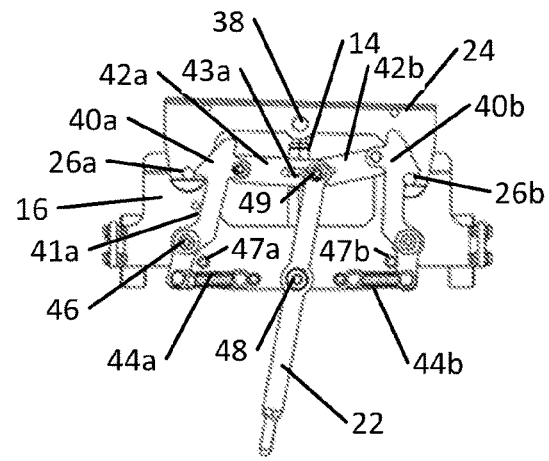
FIG. 4B schematically illustrates triggering the tilting mechanism shown in FIG. 4A.

FIG. 4B schematically illustrates triggering the tilting mechanism shown in FIG. 4A.

In the example shown, a lateral triggering force that has been applied to trigger arm 22 has rotated trigger arm 22 about trigger arm axis 48. In the example shown, trigger arm pin 49 is rotated away from latch pin 26a and toward latch pin 26b. When rotating away from latch pin 26a, trigger arm pin 49 applies a force on a proximal end of arm slot 43a, thus pulling lateral trigger arm 42a and latch 40a away from latch pin 26a. The resulting rotation of latch arm 41a about its latch arm axis 46 stretches latch spring 44a and moves latch arm 41a away from latch arm stop 47a.

Concurrently, trigger arm pin 49 travels distally along arm slot 43b without applying any lateral force on lateral trigger arm 42b that prevents latch spring 44b from keeping latch 40b engaged with latch pin 26b.

The pulling of latch 40a away from latch pin 26a disengages latch 40a from latch pin 26a, while latch 40b continues to engage latch pin 26b. Thus, the restoring force that is exerted by pistons 14 (only one is visible in FIGS. 4A to 4D) on platform connection bar 38 exerts a torque on platform bracket 24 that rotates the end of platform bracket 24 that includes latch pin 26a about latch pin 26b. As a result, the end of platform bracket 24 that includes latch pin 26a is raised relative to the end where latch pin 26b is engaged by latch 40b.

As the end of platform bracket 24 that includes latch pin 26a is raised and the, stretched latch spring 44a may exert a torque on the end of trigger arm 22a to which latch spring 44a that rotates trigger arm 22a about its latch arm axis 46, pulling that end back toward latch arm stop 47a.

In other examples, a triggering force may be applied to trigger arm 22 in the opposite direction, e.g., so as to disengage latch 40b from latch pin 26b, while latch pin 26a continues to be engaged by latch 40a. In these other examples, configurations corresponding to the configurations that are schematically illustrated in FIGS. 4B to 4D will be right-left mirror images of the configurations shown.

Figure 4C:
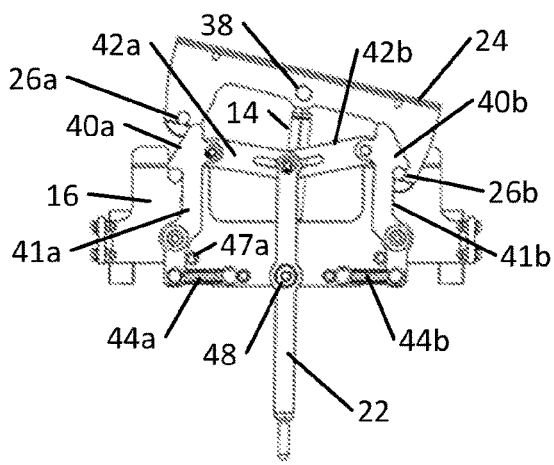
FIG. 4C schematically illustrates the tilting mechanism shown in FIG. 4A after release of the triggering mechanism.
Figure 4D:
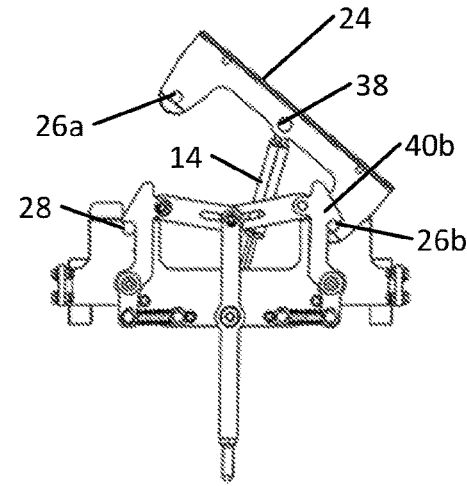
FIG. 4D schematically illustrates the tilting mechanism shown in FIG. 4A when in an unloading orientation.

FIG. 4C schematically the tilting mechanism shown in FIG. 4B after release of the triggering mechanism.

In the example shown, latch spring 44 has pulled on trigger arm 22a to rotate trigger arm 22a about latch arm axis 46 until trigger arm 22a has come to rest against latch arm stop 47a. Piston 14 continues to lengthen toward its equilibrium length, continuing to rotate the end of platform bracket 24 that includes latch pin 26a about latch pin 26b.

In some examples, a carrier cart may include structure that at least optionally prevents further rotation of platform bracket 24 about latch pin 26b, e.g., to enable inspection or manipulation of items that are supported by a tiltable platform 12 that is attached to platform bracket 24.

FIG. 4D schematically illustrates the tilting mechanism shown in FIG. 4A when in the unloading orientation.

In the example shown, piston 14 is fully extended to its equilibrium length, and platform bracket 24 is tilted in the unloading orientation.

Figure 4E:
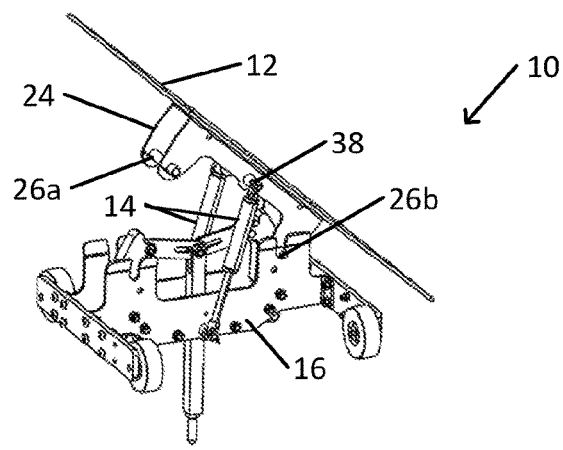
FIG. 4E is a schematic perspective view of the carrier cart shown in FIG. 1 when the platform is in the unloading orientation.

FIG. 4E is a schematic perspective view of the carrier cart shown in FIG. 1 when the platform is in the unloading orientation.

In the example shown, two pistons 14, located on opposite sides of platform bracket 24, are fully extended. Tiltable platform 12 is tilted in an unloading orientation.

A downward force that is applied to one or more points of tiltable platform 12 (e.g., on a side of tiltable platform 12 that is on the same side of latch pin 26b as pistons 14) may apply a torque to platform bracket 24 to rotate latch pin 26a back toward latch 40a. When the rotation brings tiltable platform 12 back to the loading orientation, latch 40a may engage latch pin 26a until a triggering force is again applied to trigger arm 22. For example, lowering latch pin 26a along sloped surfaces 45 of latch 40a may temporarily push back latch 40a until latch pin 26a has been lowered past latch point 39 of latch 40a. After latch pin 26a has been lowered past latch point 39, latch spring 44a may pull latch 40a back forward to engage latch pin 26a, restraining tiltable platform 12 in its loading orientation.

If the triggering force that is applied to trigger arm 22 is opposite to the force that rotated trigger arm 22 as in FIG. 4B, the end of platform bracket 24 that includes latch pin 26b is raised, and the direction of tilt of tiltable platform 12 would be opposite to the direction of tilt shown in FIG. 4E.

In other examples, a tilting mechanism may be a unidirectional tilting mechanism that is configured to enable tilting of tiltable platform 12 to one side only.

Figure 5A:
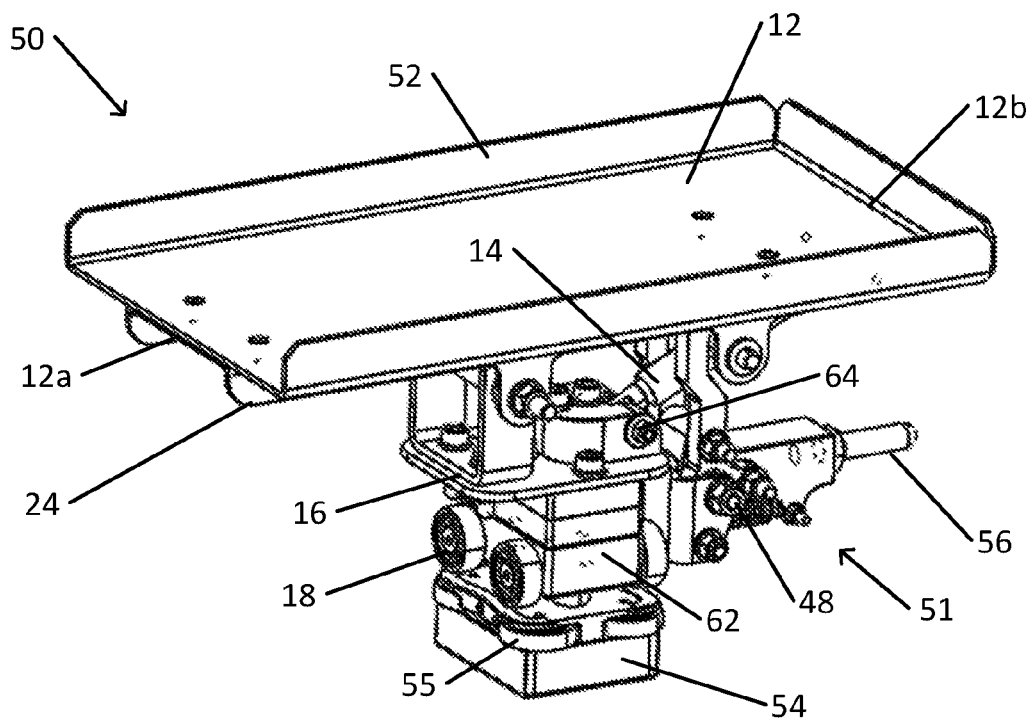
FIG. 5A schematically illustrates a carrier in the form of a cart with a unidirectional tilting mechanism, in accordance with an embodiment of the invention.
Figure 5B:
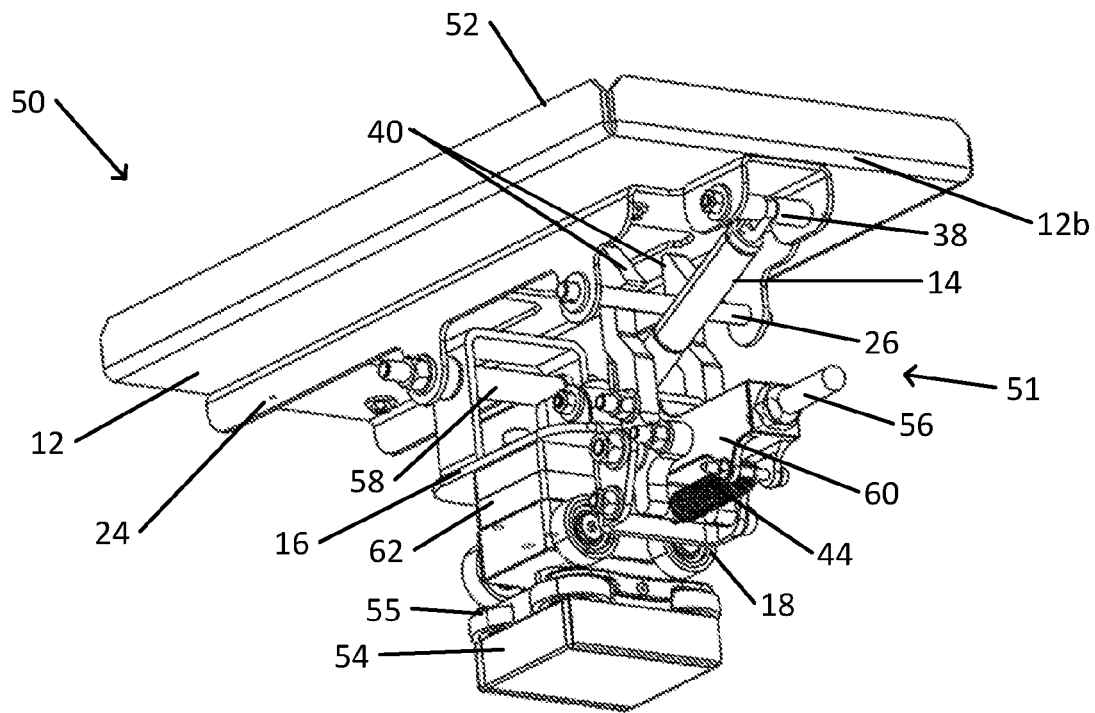
FIG. 5B is another schematic view of the carrier cart shown in FIG. 5A showing the tilting mechanism.

FIG. 5A schematically illustrates an example of a carrier in the form of a cart with a unidirectional tilting mechanism, in accordance with an embodiment of the invention. FIG. 5B is another schematic view of the carrier cart shown in FIG. 5A showing the tilting mechanism.

Carrier cart 50 includes unidirectional tilting mechanism 51 that is configured to tilt tiltable platform 12 in a single direction. When tiltable platform 12 is tilted, platform end 12b is raised and platform end 12a is lowered. Thus, one or more sides of tiltable platform 12 that are not in the direction of the tilt (e.g., excepting platform end 12a) may include a barrier 52. Barrier 52 may prevent or impede items from falling off a side of tiltable platform 12. In the example shown, barrier 52 is in the form of a low wall. In other examples, tiltable platform 12 may include other types or sizes of barriers, or may lack barriers. In some cases, as described below, barrier 52 may be provided with a section that may be closed to prevent an item from falling off of tiltable platform 12 during transport, and that may open at an end of tiltable platform 12 that is tilted downward.

In the example shown, tiltable platform 12 is oriented in a loading orientation that is substantially horizontal. When tiltable platform 12 is in the loading orientation, latch pin 26 on platform bracket 24, to which tiltable platform 12 is attached, is held in place by one or more latches 40. Latches 40 are located at an end of latch arm 60, which is fixed to carrier chassis 16 by trigger arm axis 48. A pulling force that is exerted on latch arm 60 by latch spring 44 maintains contact between latches 40 and latch pin 26. Also when tiltable platform 12 is in the loading orientation, piston 14 is compressed from its equilibrium configuration. The compressed piston 14 exerts a pushing force between platform connection bar 38 of platform bracket 24 and chassis connection bar 64 of carrier chassis 16. This pushing force is countered by the restraining force that is exerted on latch pin 26 by latches 40.

Trigger arm 56 is connected to latches 40 by latch arm 60. In the example shown, when trigger arm 56 is lifted upward, overcoming the force that is exerted by latch spring 44, latch arm 60 rotates about trigger arm axis 48. The rotation of latch arm 60 removes latches 40 from latch pin 26. With latches 40 removed from latch pin 26, the pushing force of piston 14 on platform connection bar 38 is no longer countered. Since platform connection bar 38 is closer to platform end 12b than to platform end 12a, the pushing force exerts a torque to rotate platform bracket 24 and tiltable platform 12 about platform axis 58 that raises platform end 12b and lowers platform end 12b. Tiltable platform 12 may be tilted to the unloading orientation, facilitating unloading of items from tiltable platform 12 via platform end 12a.

In other examples, a triggering mechanism may be configured to be triggered by another action other than raising of trigger arm 56, e.g., by another type of movement of a trigger mechanism, electrically, magnetically, thermally, or otherwise.

In the example shown, platform axis 58 is located near the midline of tiltable platform 12, e.g., approximately equidistant from platform end 12a and platform end 12b. In other examples, platform axis 58 may be located closer to one end of tiltable platform 12 than to the other end.

In the example shown, piston 14 is in the form of a gas piston that is compressed when tiltable platform 12 is in the loading orientation. In other examples, piston 14 may include another type of compressible (or stretchable) resilient element.

Carrier cart 50 is configured to be propelled along a track such as carrier track 70 (shown in FIG. 7A), as described below. For example, propulsion mechanism 54 may represent a self-propulsion mechanism (e.g., and electrical motor and transmission) that propels horizontal wheels 55, e.g., functioning as drive wheels, to roll along carrier track 70, supported on wheels 18. Horizontal wheels 55 are configured to rotate horizontally about a vertical axis, e.g., to generate a propelling force when in contact with a vertical or sloped surface. In other examples, drive wheels may be otherwise oriented, e.g., vertically to rotate about a horizontal axis, or with an intermediate slope. In other examples, drive wheels may be arranged in row with, or may be identical with, wheels 18.

Alternatively or in addition, a propulsion mechanism may be external to carrier cart 50. For example, propulsion mechanism 54 may include a ferromagnetic material that is configured to be pulled along by a magnet that is moved within carrier track 70. In another example, propulsion mechanism 54 may be configured to attach to or grab a cable or belt that moves within or next to carrier track 70. In such an example, horizontal wheels 55 may be free spinning, e.g., to provide lateral stability when travelling along carrier track 70.

Spacing structure 62 is configured to hold tiltable platform 12 at a height above carrier track 70. For example, the height of tiltable platform 12 may be selected to provide sufficient clearance between tiltable platform 12 in one or more orientations and a platform or other structure that is located alongside carrier track 70.

Figure 6A:
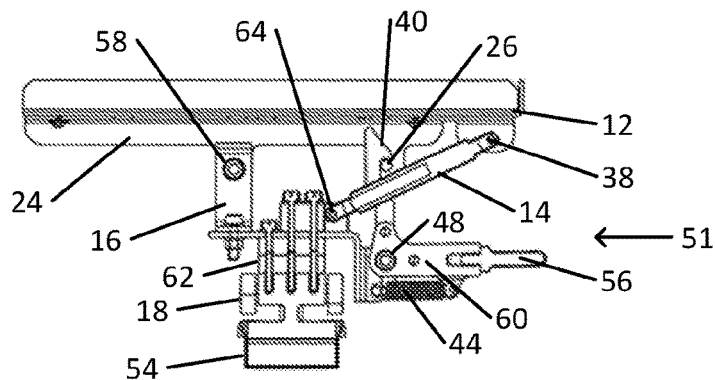
FIG. 6A is a schematic side view of the tilting mechanism of the carrier cart shown in FIG. 5A when in the loading orientation.

FIG. 6A is a schematic sectional side view of the tilting mechanism of the carrier cart shown in FIG. 5A when in the loading orientation.

Figure 6B:
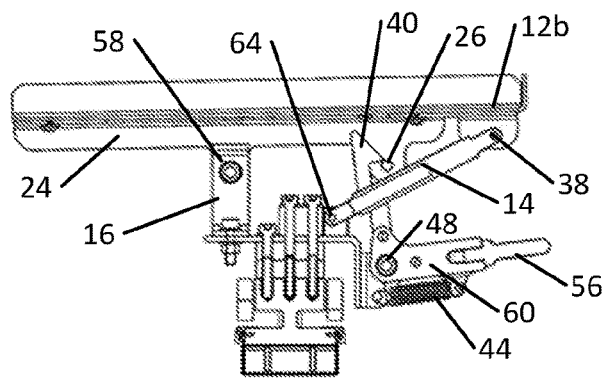
FIG. 6B schematically illustrates triggering the tilting mechanism shown in FIG. 6A.

FIG. 6B schematically illustrates triggering the tilting mechanism shown in FIG. 6A.

In the configuration shown, trigger arm 56 has been raised, rotating latch arm 60 proximally and disengaging latch 40 from latch pin 26. When raising trigger arm 56, latch spring 44 has been stretched, exerting a force that tends to lower trigger arm 56. Expansion of piston 14 thus exerts a torque on platform connection bar 38 at platform bracket 24, near platform end 12b. The torque rotates tiltable platform 12 about platform axis 58, raising platform end 12b and lowering platform end 12a.

Figure 6C:
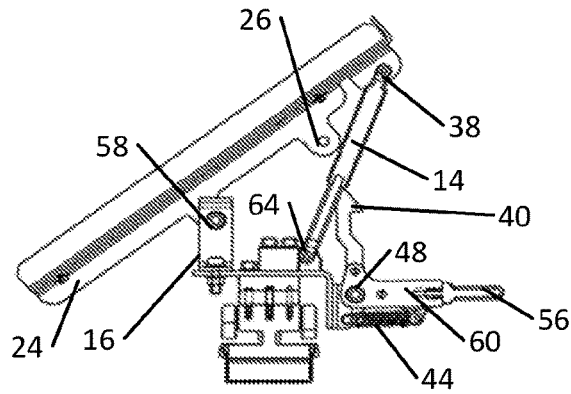
FIG. 6C schematically illustrates the tilting mechanism shown in FIG. 6A when in the unloading orientation.
Figure 6D:
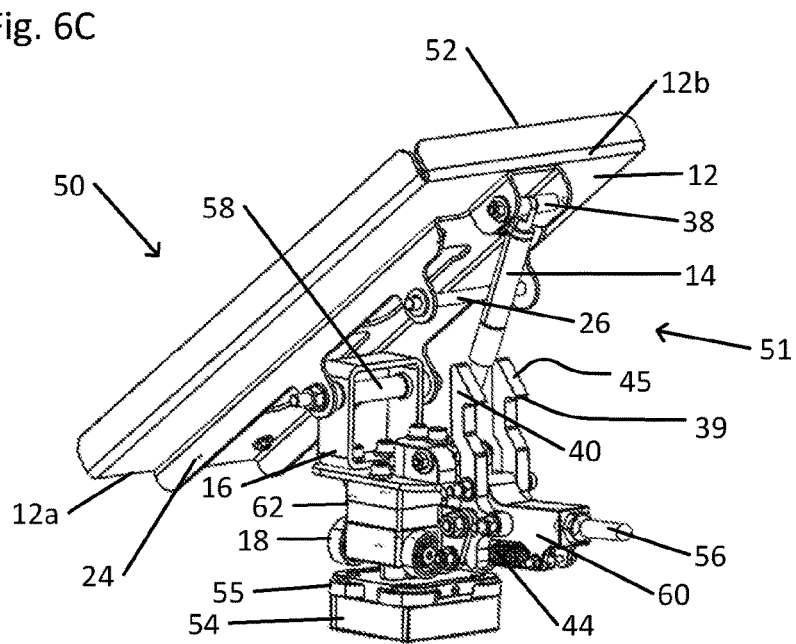
FIG. 6D is a schematic perspective view of the carrier cart shown in FIG. 5B when the platform is in the unloading orientation.

FIG. 6C schematically illustrates the tilting mechanism shown in FIG. 6B when in the unloading orientation. FIG. 6D is a schematic perspective view of the carrier cart shown in FIG. 5B when the platform is in the unloading orientation.

Contraction of latch spring 44 has rotated latch arm 60, and thus latch 40 and trigger arm 56, back to their positions as in FIG. 6A. Piston 14 has fully expanded, raising platform end 12b and lowering platform end 12a to tilt tiltable platform 12 to the unloading orientation.

In this configuration, a downward force may be exerted on platform end 12b, compressing piston 14 and lowering platform end 12b (and raising platform end 12a) until latch pin 26 is engaged by latches 40. For example, lowering latch pin 26 along sloped surfaces 45 of latches 40 may temporarily push back latches 40 until latch pin 26 has been lowered past latch point 39. After latch pin 26 has been lowered past latch point 39, latch spring 44 may pull latches 40 back forward to engage latch pin 26, restoring tiltable platform 12 to its loading orientation.

Figure 7A:
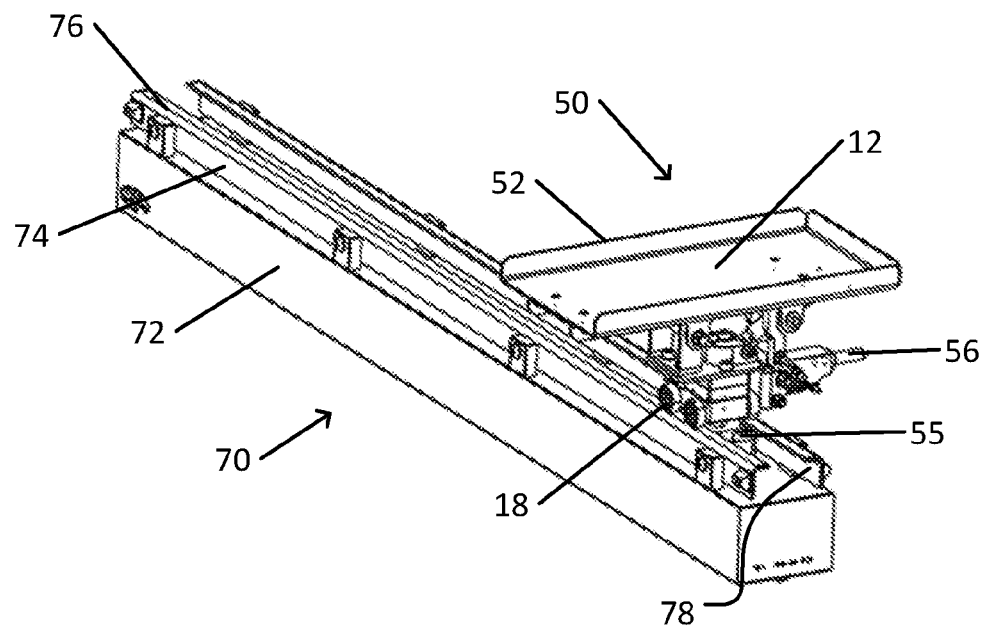
FIG. 7A schematically illustrates a segment of a track supporting the carrier cart shown in FIG. 5A with its platform in the loading orientation.
Figure 7B:
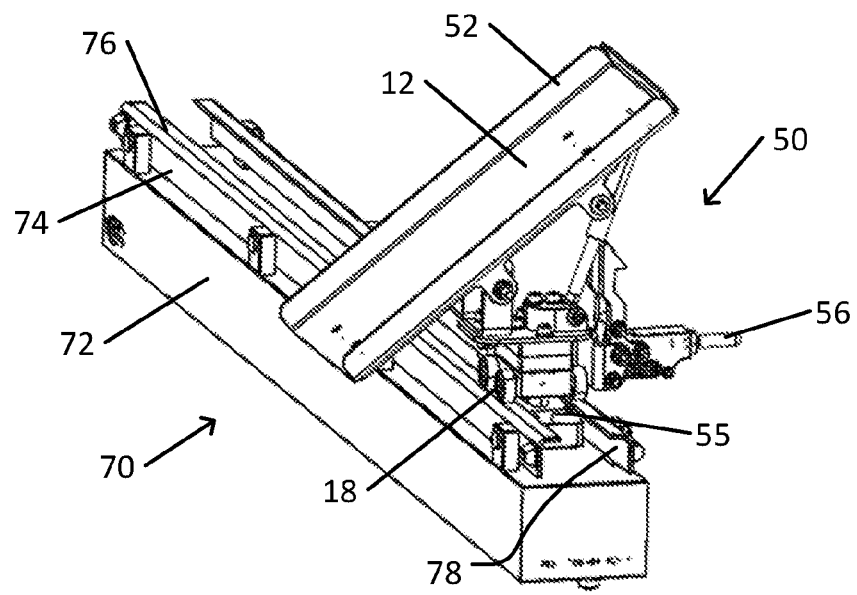
FIG. 7B schematically illustrates the track segment and carrier cart shown in FIG. 7A with the platform in the unloading orientation.

FIG. 7A schematically illustrates a segment of a track supporting the carrier cart shown in FIG. 5A with its platform in the loading orientation. FIG. 7B schematically illustrates the track segment and carrier cart shown in FIG. 7A with the platform in the unloading orientation.

In the example shown, carrier track 70 is configured to enable carrier cart 50 to self-propel to travel along carrier track 70. Carrier track 70 includes two rails 74 mounted on track base 72. Horizontal wheels 55 are configured to contact and apply friction to wall surfaces 78 of rails 74 such that rotation of horizontal wheels 55 propels carrier cart 50 along rails 70. Wheels 18 of carrier cart 50, e.g., provided with bearings or otherwise enabled to rotate freely with minimum friction, are configured to roll along top surfaces 76 of rails 74.

In some examples, electrical power for operation of a self-propulsion motor of a propulsion mechanism 54 may be provided by electrical conduction of an electrical current that is conducted by, or by a component of, one or both of rails 74. In other examples, propulsion mechanism 54 may include a storage battery, or electrical or other power may be otherwise provided.

Alternatively or in addition to rails 74, a carrier track may include a channel, chute, or monorail in or on which carrier cart 50 is configured to self propel or be externally propelled, an overhead rail or bar (e.g., wherein horizontal wheels 55 are incorporated into an overhead chassis component from which tiltable platform and additional chassis elements are suspended), or other structure that enable a carrier cart to be propelled along the track.

In some cases, a carrier cart may include a door that is closed when tiltable platform 12 is in the loading orientation, and opened when tiltable platform 12 is in the unloading orientation.

Figure 9A:
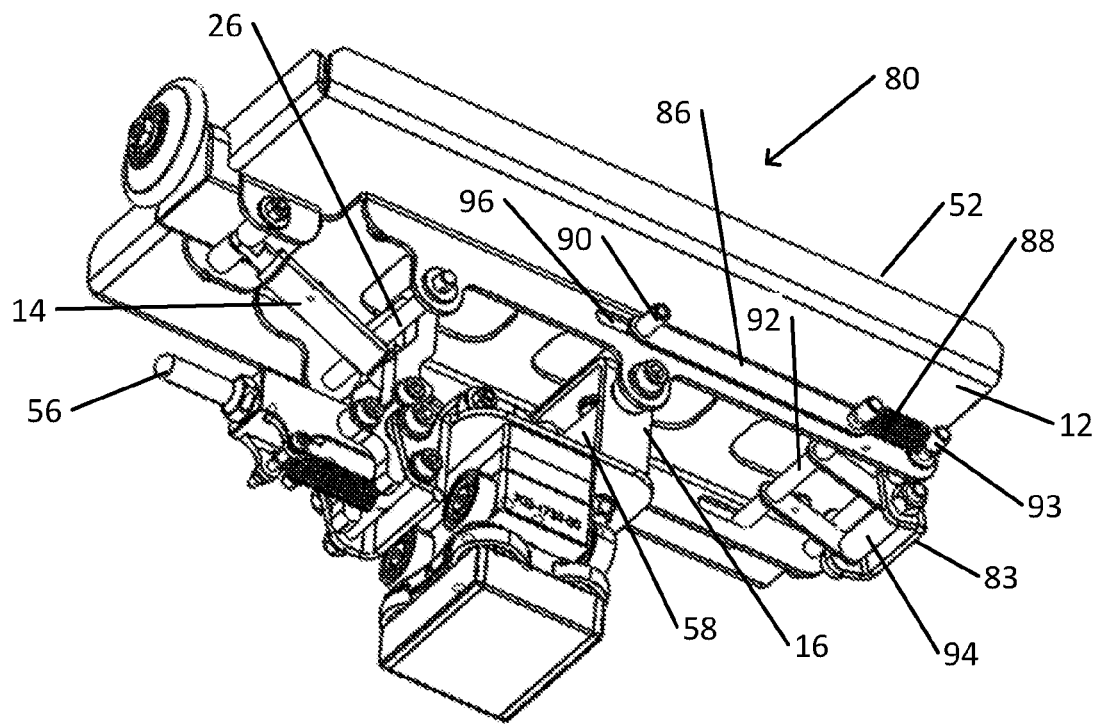
FIG. 9A schematically illustrates the carrier cart shown in FIG. 8A, showing the bottom of the platform.

FIG. 8A schematically illustrates a variant of the carrier cart shown in FIG. 5A that includes a door mechanism with its platform in the loading orientation and the door closed. FIG. 9A schematically illustrates the carrier cart shown in FIG. 8A, showing the bottom of the platform.

In the example shown, when tiltable platform 12 of carrier cart 80 is in the loading orientation, as shown, tiltable platform 12 is surrounded on three sides by barrier 52 and on the fourth side by platform door 82. In other examples, e.g., when carrier cart 80 is provided with a bidirectional tilting mechanism, tiltable platform 12 may include two platform doors 82, e.g., on opposite lateral sides of tiltable platform 12 which may be tilted downward.

When tiltable platform 12 is in the loading orientation, door arm 83, which extends downward from platform door 82, is held against tiltable platform 12. Door spring 88 exerts a pulling force on slidable rod 92, which is coupled to platform door 82 and which is confined to slot 97 on the underside of tiltable platform 12, toward fixed rod 93, which is fixed to tiltable platform 12. The pulling force on slidable rod 92 forces door axis 94 toward door arm 83. This force may prevent a pushing force platform door 82 (e.g., exerted by an item that is supported by tiltable platform 12, and that does not exceed a maximum limit) from opening platform door 82.

Figure 8B:
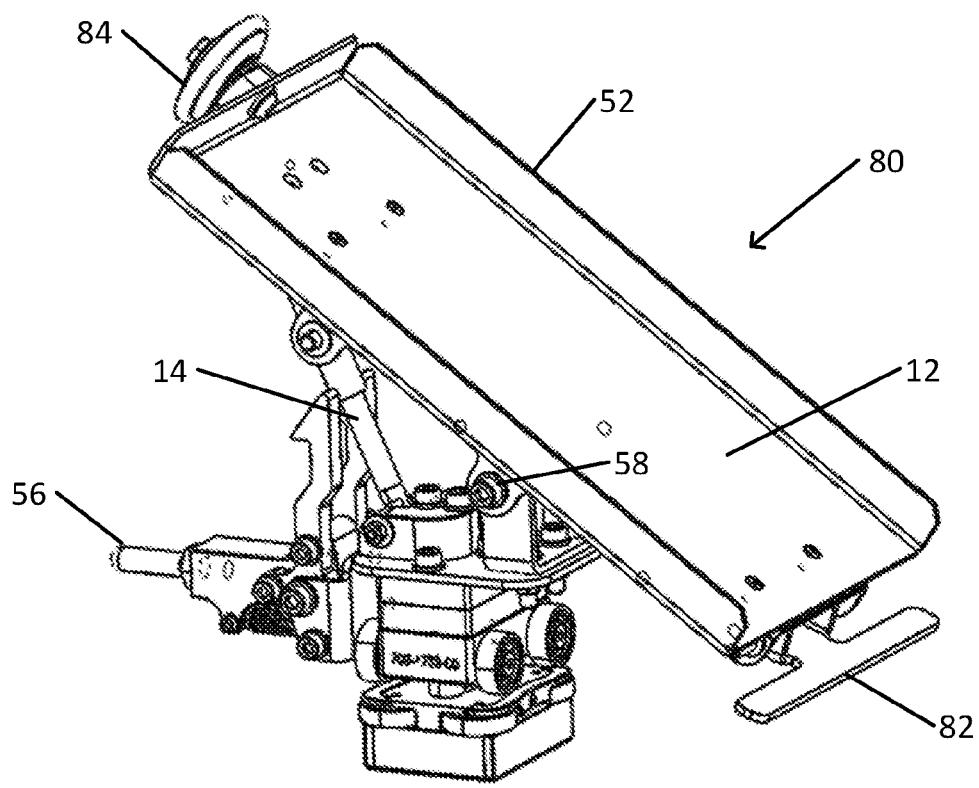
FIG. 8B schematically illustrates the carrier cart shown in FIG. 8A with its platform in the unloading orientation and the door open.
Figure 9B:
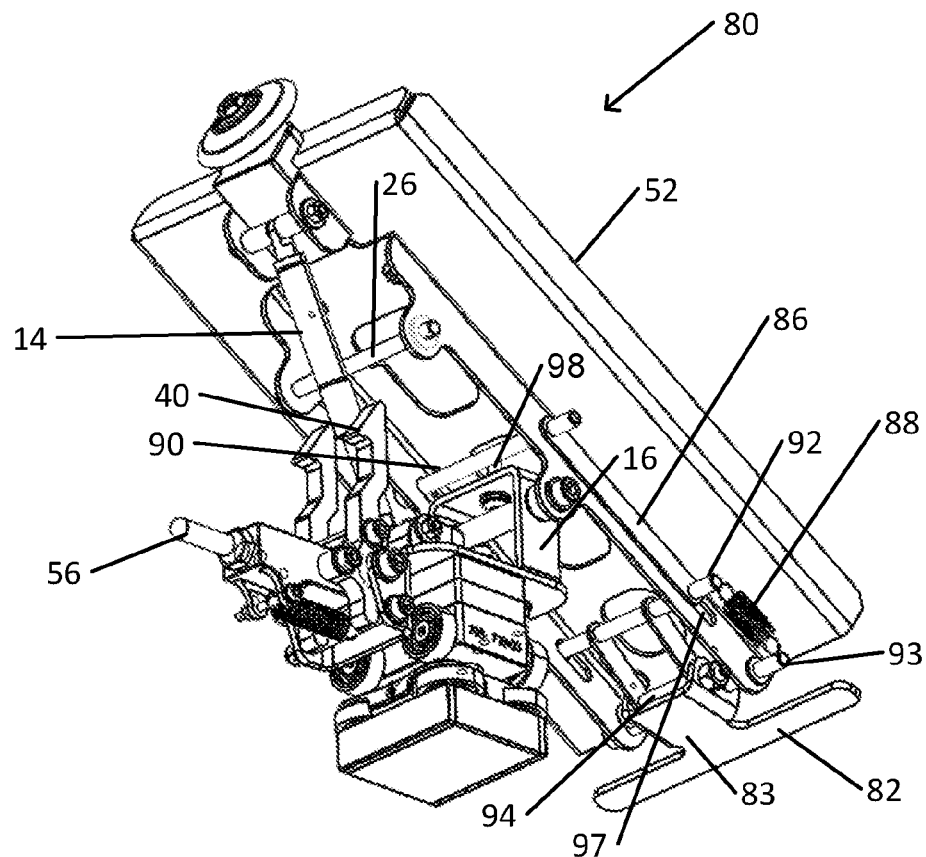
FIG. 9B schematically illustrates the carrier cart shown in FIG. 8B, showing the bottom of the platform.

FIG. 8B schematically illustrates the carrier cart shown in FIG. 8A with its platform in the unloading orientation and the door open. FIG. 9B schematically illustrates the carrier cart shown in FIG. 8B, showing the bottom of the platform.

When trigger arm 56 is operated to enable piston 14 to tilt tiltable platform 12 to the unloading orientation, the tilting causes slidable rod 90, which is confined to slot 96 on the underside of tiltable platform 12, to be pushed away from fixed rod 93 by column 98, which is fixed to carrier chassis 16. Since slidable rods 90 and 92 are coupled to one another by slide bar 86, the pushing on slidable rod 90 pulls slidable rod 92 away from fixed rod 93, stretching door spring 88. The pulling on slidable rod 92 pulls door arm 83 against fixed rod 93, enabling door arm 83 and platform door 82 to rotate about door axis 94, opening platform door 82.

When tiltable platform 12 is tilted back to the loading orientation, door spring 88 may pull slidable rod 92, and thus slide bar 86 and slidable rod 90, back toward fixed rod 93, closing platform door 82. For example, transport of carrier cart 80 after items are unloaded from tiltable platform 12 in the unloading orientation may bring reset wheel 84 under a downward (e.g., relative to the direction of travel of carrier cart 80) sloping inclined surface. Contact between the inclined surface and reset wheel 84 may push reset wheel 84 downward until latch pin 26 is engaged by latch 40, locking tiltable platform 12 into the loading orientation. Other mechanisms may be used to tilt tiltable platform 12 back into the loading orientation.

A door opening mechanism may be designed for use with a bidirectional tilting mechanism, e.g., to open the platform door that is downwardly tilted. Alternatively, the mechanism may be designed to open both an upwardly tilted door (where in any event items are unlikely to slide off of tiltable platform 12) and a downwardly tilted door. Other mechanisms for opening and closing doors (e.g., mechanical, magnetic, motorized, pneumatic, hydraulic, or other mechanism) may be used.

Different embodiments are disclosed herein. Features of certain embodiments may be combined with features of other embodiments; thus certain embodiments may be combinations of features of multiple embodiments. In particular, the various tilting, restraining, propulsion, door opening, and other mechanisms that were described in connection with either a bidirectional tilting mechanism or a unidirectional tilting mechanism, may be used with the other mechanism, either directly applied or adapted to the other mechanism in a manner that is known in the art.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A carrier comprising:
a chassis that is configured to travel;
a tiltable platform that is mounted on the chassis;
a resilient piston that is connected between the chassis and the tiltable platform, the piston configured to store energy when the platform is rotated from an unloading orientation to a loading orientation, the platform, when in the loading orientation, configured to stably support one or more items that are loaded onto the platform at a loading point;
a restraining mechanism that is configured to maintain the platform in the loading orientation; and
a triggering mechanism that is operable to release the restraining mechanism, releasing the stored energy of the piston to exert a restoring force to tilt the platform from the loading orientation to the unloading orientation at an unloading point.

2. The carrier of claim 1, wherein the loading orientation is substantially horizontal.

3. The carrier of claim 1, wherein the platform is tillable to either of two unloading orientations.

4. The carrier of claim 3, wherein a direction of tilt of a first unloading orientation of the two unloading orientations is opposite to a direction of tilt of a second unloading orientation of the two unloading orientations.

5. The carrier of claim 1 wherein the restraining mechanism comprises at least one latch.

6. The carrier of claim 5, wherein each latch of said at least one latch is configured to engage a pin to maintain the platform in the loading orientation.

7. The carrier of claim 6, wherein the triggering mechanism comprises a trigger arm that is operable to retract a latch of said at least one latch from engaging its pin.

8. The carrier of claim 7, wherein the restraining mechanism further comprises at least one spring, each spring configured to maintain a latch of said of each one latch in a position to engage its pin, and to restore that latch to that position after retraction of that latch.

9. The carrier of claim 6, wherein said at least one latch is mounted on the chassis and is configured to engage a pin that is mounted on the platform.

10. The carrier of claim 9, wherein said at least one latch comprises two latches that are each configured to engage a different pin of two pins that are mounted at different sides of the platform.

11. The carrier of claim 10, wherein the triggering arm is rotatable in one direction to retract one latch of the two latches to enable the platform to tilt to one of two unloading orientations, and in another direction to retract the other latch of the two latches to enable the platform to tilt to another of two unloading orientations.

12. The carrier of claim 11, wherein the piston is configured to apply the restoring force to a point along a midline between the two pins such that when the triggering arm is rotated to retract one of the two latches from one of the two pins, the restoring force rotates the platform about the pin of the two pins from which the other of the two latches was not retracted.

13. The carrier of claim 11, wherein the triggering arm is connected to each of the two latches by a different lateral arm.

14. The carrier of claim 13, wherein an elongated slot extends along an elongated dimension of each of the different lateral arms.

15. The carrier of claim 9, wherein the platform is configured to rotate about an axis that is located substantially at a midline between opposite ends of the platform and the pin is mounted between the axis and one of the opposite ends of the platform.

16. The carrier of claim 15, wherein the piston is configured to exert the restoring force on the platform on the side of the axis on which the pin is mounted.

17. The carrier of claim 1, wherein the platform includes a barrier to prevent an item from falling off of the platform.

18. The carrier of claim 1, wherein the carrier is configured to travel along a track.

19. The carrier of claim 18, wherein the carrier is configured to be magnetically propelled along the track.

* * * * *